2,769,812
Patented Nov. 6, 1956

2,769,812

1-METHYL-2-(3,3-DIPHENYLPROPYL)PIPERIDINE AND PREPARATION THEREOF

Arlo Wayne Ruddy, Albany, N. Y., assignor to Sterling Drug Inc., New York, N. Y., a corporation of Delaware No Drawing. Application August 15, 1950,
Serial No. 179,641

2 Claims. (Cl. 260—293)

This invention relates to a new substance, 1-methyl-2-(3,3-diphenylpropyl)piperidine and salts thereof which are useful as pharmacodynamic agents and in particular as antispasmodic agents. This invention also relates to the process for preparing 1-methyl-2-(3,3-diphenylpropyl)piperidine.

My new compound is prepared by condensation of diphenylacetonitrile with a 1-methyl-2-(2-haloethyl)-piperidine in the presence of a strong metalating agent such as an alkali metal amide or hydride, preferably sodium amide, and heating the intermediate 1-methyl-2-piperidylethyldiphenylacetonitrile with sodium amide to replace the cyano group by hydrogen. The two steps are represented by the following scheme:

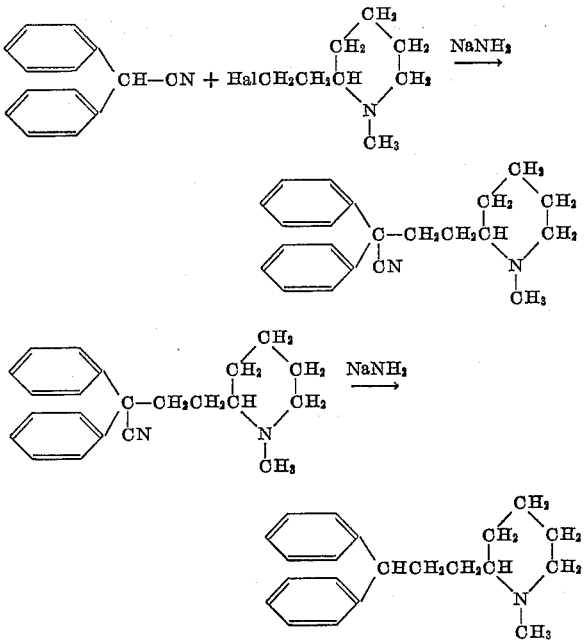

When sodium amide is used in the alkylation step, the intermediate 1-methyl-2-piperidylethyldiphenylacetonitrile is not produced in pure form because some of the molecules undergo the second reaction wherein the nitrile group is lost. Actually a mixture of the intermediate nitrile and the final product is formed. The final heating with sodium amide converts the nitrile present in this mixture to the desired final product so that a homogeneous material is obtained.

The 1-methyl-2-(3,3-diphenylpropyl)piperidine is preferably used in the form of non-toxic, water-soluble acid-addition salts or quaternary ammonium derivatives. The acids which can be used to prepare the acid-addition salts are those which produce, when combined with 1-methyl-2-(3,3-diphenylpropyl)piperidine in the free base form, salts whose anions are relatively innocuous to the animal organism in therapeutic doses of the salts, so that the beneficial physiological properties inherent in the base are not vitiated by any side effects ascribable to the anions. Suitable acid-addition salts are those derived from mineral acids such as hydrochloric acid, hydrobromic acid, hydriodic acid and sulfuric acid, and organic acids such as acetic acid, citric acid and tartaric acid. The quaternary ammonium salts are prepared by mixing the free base with a lower alkyl or aralkyl ester of a strong inorganic acid or organic sulfonic acid, preferably in an inert organic solvent such as benzene or ether, optionally with gentle heating. The salt either crystallizes immediately or can obtained by concentration of the solvent. Exemplary alkyl or aralkyl esters of inorganic acids or organic sulfonic acids which can be used to prepare quaternary ammonium salts of 1-methyl-2-(3,3-diphenylpropyl)piperidine include methyl chloride, methyl bromide, methyl iodide, ethyl bromide, propyl chloride, benzyl chloride, benzyl bromide, methyl sulfate, methyl benzenesulfonate, and methyl p-toluenesulfonate.

The following example will further illustrate my invention but it is not to be construed as limitative.

EXAMPLE (a) *1-methyl-2-(2-chloroethyl)piperidine*

1-methyl-2-(2-chloroethyl)piperidine hydrochloride (Norton et al., J. Am. Chem. Soc. 68, 1573 (1946)), M. P. 134–135° C. (73 g., 0.37 m.), was suspended in 400 cc. of ether, and 45 g. (0.42 m.) of sodium carbonate dissolved in 450 cc. of water was added in a fine stream with stirring. The aqueous layer was then separated and extracted with ether. The combined ether layers were dried over anhydrous sodium sulfate, concentrated and distilled. The fraction boiling at 86–87° C. (11 mm.) was collected, giving 57.6 g. of 1-methyl-2-(2-chloroethyl)piperidine, $n_D^{25}=1.4758$.

(b) A solution of 29 g. (0.15 m.) of diphenylacetonitrile in 100 cc. of dry benzene was added to a stirred suspension of 25 g. of sodium amide in 75 cc. of dry benzene, and the mixture was warmed at 50° C. for two hours. Then 24.5 g. (0.15 m.) of 1-methyl-2-(2-chloroethyl)piperidine was added, and the mixture heated at 60–65° C. for three hours. The suspension was then cooled, the excess sodium amide carefully decomposed with water, and the organic layer was separated and washed with water. The benzene solution was made acid to Congo red with concentrated hydrochloric acid and washed several times with water. The aqueous acid layer was separated and made alkaline with sodium hydroxide solution, and the liberated base was extracted with ether and dried over sodium hydroxide pellets. The ether solution was concentrated and the residue distilled. The fraction boiling at 168–185° C. (1.0 mm.) was collected, giving 31.2 g. of a mixture of 1-methyl-2-piperidylethyldiphenylacetonitrile and 1-methyl-2-(3,3-diphenylpropyl)-piperidine, $n_D=1.5592$.

(c) *1-methyl-2-(3,3-diphenylpropyl)piperidine and its hydrochloride*

A solution of 27.5 g. (0.09 m.) of the mixture of 1-methyl-2-piperidylethyldiphenylacetonitrile and 1-methyl-2-(3,3-diphenylpropyl)piperidine obtained in part (b) above in 100 cc. of dry benzene was added to a suspension of 15 g. (0.4 m.) of sodium amide in refluxing benzene, and the mixture was stirred and refluxed for fifteen hours. The suspension was cooled, excess sodium amide carefully decomposed with 150 cc. of water, and the layers separated. The aqueous solution was extracted with ether, and the combined ether layers were washed with water. The ether solution was made acid to Congo red with dilute hydrochloric acid, the acid layer separated and the ether further extracted with water. The combined aqueous extracts were washed with ether and made alkaline with 35% sodium hydroxide solution. The liberated base was extracted with ether and dried over sodium hydroxide pellets, concentrated and distilled. The fraction boiling at 176–178° C. (1.5 mm.) was collected, giving 19.6 g. of 1-methyl-2-(diphenylpropyl)piperidine, $n_D = 1.5565$.

1-methyl-2-(3,3-diphenylpropyl)piperidine was converted to its hydrochloride by treatment with excess gaseous hydrogen chloride dissolved in ethanol. Concentration of the solution caused separation of 16 g. of the hydrochloride, M. P. 185–186° C. Recrystallization from an ethanol-ether mixture gave a sample of 1-methyl-2-(3,3-diphenylpropyl)piperidine hydrochloride, M. P. 187.5–188.5° C.

*Analysis.*—Calcd. for $C_{21}H_{27}N \cdot HCl$: C, 76.45; H, 8.56; Cl, 10.75. Found: C. 76.49; H, 8.53; Cl, 10.71.

(d) *1-methyl-2-(3,3-diphenylpropyl)piperidine methiodide*

1-methyl-2-(3,3-diphenylpropyl)piperidine hydrochloride (6.6 g.) was suspended in water and excess alkali was added. The free base was extracted with ether and dried over sodium hydroxide pellets. The ether solution was concentrated and the residue dissolved in 60 cc. of dry benzene. Methyl iodide (7 g.) was added, and the solution was warmed gently, then cooled and scratched to induce crystallization. The supernatant liquid was diluted with ethyl acetate and the precipitate collected by filtration, giving 8.7 g. of 1-methyl-2-(3,3-diphenylpropyl)-piperidine methiodide, M. P. 199–201° C. A sample recrystallized from methanol-ethyl acetate had the M. P. 203–205° C.

*Analysis.*—Calcd. for $C_{22}H_{30}IN$: C, 60.69; H, 6.95; I, 29.15. Found: C, 60.67; H, 6.98; I, 29.40.

In part (b) hereinabove the sodium amide can be replaced by an equivalent amount of sodium hydride.

I claim:

1. The process for preparing 1-methyl-2-(3,3-diphenylpropyl)piperidine which comprises heating diphenylacetonitrile with a 1-methyl-2-(2-haloethyl)piperidine in the presence of a strong metalating agent at a temperature of about 50° C., and heating the resulting product with sodium amide at a temperature of at least about 80° C.

2. The process for preparing 1-methyl-2-(3,3-diphenylpropyl)piperidine which comprises heating diphenylacetonitrile with 1-methyl-2-(2-chloroethyl)piperidine in the presence of sodium amide at a temperature of about 50° C., and heating the resulting product with sodium amide at a temperature of at least about 80° C.

References Cited in the file of this patent

UNITED STATES PATENTS

| | | |
|---|---|---|
| 2,211,152 | Nicodemus et al. | Aug. 13, 1940 |
| 2,230,774 | Bockmuhl et al. | Feb. 4, 1941 |
| 2,398,575 | Bergel et al. | Apr. 16, 1946 |
| 2,446,522 | Bockmuhl et al. | Aug. 10, 1948 |
| 2,566,535 | Ruddy | Sept. 4, 1951 |
| 2,599,365 | Berger et al. | June 3, 1952 |

FOREIGN PATENTS

| | | |
|---|---|---|
| 624,117 | Great Britain | May 27, 1949 |
| 627,139 | Great Britain | July 29, 1949 |

OTHER REFERENCES

Foster et al.: Chem. Abst. 40 (1946), p. 5143.